(12) United States Patent
Park et al.

(10) Patent No.: US 10,754,615 B2
(45) Date of Patent: Aug. 25, 2020

(54) APPARATUS AND METHOD FOR PROCESSING USER INPUT FOR VEHICLE

(71) Applicants: Hyundai Motor Company, Seoul (KR); Kia Motors Corporation, Seoul (KR)

(72) Inventors: Sung Soo Park, Seoul (KR); Bi Ho Kim, Gyeonggi-do (KR); Hyun Jin Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 399 days.

(21) Appl. No.: 15/829,471

(22) Filed: Dec. 1, 2017

(65) Prior Publication Data
US 2019/0114137 A1 Apr. 18, 2019

(30) Foreign Application Priority Data
Oct. 12, 2017 (KR) ................... 10-2017-0132157

(51) Int. Cl.
*G06F 3/16* (2006.01)
*B60W 50/10* (2012.01)
*G10L 15/22* (2006.01)

(52) U.S. Cl.
CPC ............. *G06F 3/167* (2013.01); *B60W 50/10* (2013.01); *G10L 15/22* (2013.01); *B60W 2540/21* (2020.02)

(58) Field of Classification Search
CPC ........... G06F 17/28; G06F 3/167; G10L 15/22
See application file for complete search history.

(56) References Cited

U.S. PATENT DOCUMENTS

| | | | |
|---|---|---|---|
| 10,339,925 B1 * | 7/2019 | Rastrow | H04L 67/306 |
| 2003/0182394 A1 * | 9/2003 | Ryngler | G01C 21/3629 709/217 |
| 2010/0312547 A1 * | 12/2010 | Van Os | G10L 15/26 704/9 |
| 2015/0066479 A1 * | 3/2015 | Pasupalak | G06F 40/40 704/9 |
| 2015/0348551 A1 * | 12/2015 | Gruber | H04M 3/4936 704/235 |
| 2016/0378747 A1 * | 12/2016 | Orr | G06F 16/48 704/9 |
| 2017/0154629 A1 * | 6/2017 | Lu | G10L 15/22 |
| 2019/0034429 A1 * | 1/2019 | Das | G06F 40/35 |
| 2019/0034813 A1 * | 1/2019 | Das | G06N 5/022 |

* cited by examiner

Primary Examiner — Jakieda R Jackson
(74) Attorney, Agent, or Firm — Mintz Levin Cohn Ferris Glovsky and Popeo, P.C.; Peter F. Corless

(57) ABSTRACT

A user input processing apparatus for a vehicle includes: an operation command generator recognizing a first semantic frame from a user voice, generating a first operation command based on the recognized first semantic frame, recognizing a second semantic frame from the user voice, and generating a second operation command based on the recognized second semantic frame; a sequence determination unit generating an execution sequence of the first operation command and the second operation command; and a controller controlling an execution of the first operation command and the second operation command based on the generated execution sequence and a relation between the first operation command and the second operation command.

18 Claims, 11 Drawing Sheets

| FIRST ORDER | SECOND ORDER | THIRD ORDER | FOURTH ORDER | FOURTH ORDER |
|---|---|---|---|---|
| VEHICLE SAFETY CONTROL | REAL TIME PROCESSING | GENERAL PROCESSING | INFORMATION VERIFICATION | INFORMATION SHARING |
| VEHICLE DRIVING CONTROL | DESTINATION SETTING | RESERVATION FOR DESTINATION | WEATHER VERIFICATION | TRANSMISSION OF TEXT MESSAGE |
| WARNING LIGHT GUIDE | MAKING CALL | SCHEDULE REGISTRATION | MISSED CALL VERIFICATION | SNS REGISTRATION |
| PARTS REPLACEMENT GUIDE | BROADCASTING | NOTIFICATION REGISTRATION | SCHEDULE VERIFICATION | MUSIC SHARING |
| ... | | ... | ... | ... |

APPARATUS AND METHOD FOR PROCESSING USER INPUT FOR VEHICLE

CROSS-REFERENCE TO RELATED APPLICATION

This application is claims the benefit of priority to Korean Patent Application No. 10-2017-0132157, filed on Oct. 12, 2017 in the Korean Intellectual Property Office, the disclosure of which is incorporated herein in its entirety by reference.

TECHNICAL FIELD

The present disclosure relates generally to user input processing and, more particularly, to a user input processing apparatus for a vehicle and a corresponding user input processing method.

BACKGROUND

Currently, many devices are installed in vehicles for the primary purpose of enhancing the convenience of drivers and passengers. For example, devices like an audio device, an air conditioner, a navigation device, or the like have been mounted in almost all vehicles.

These devices may provide the driver and passengers with various conveniences. However, the driver may become distracted when operating the devices while driving, causing the risk of accidents to increase.

To address the problem, speech recognition devices for vehicles have been recently developed. When the driver commands through voice without the driver's manual input, the speech recognition device may recognize the driver's voice to control various types of convenient devices depending on the voice command of the driver.

Speech recognition devices may receive a voice command from the driver and may execute an operation corresponding to the received voice command. However, if the voice command of the driver lists a plurality of operations, the driver is often forced to resort to manual input since the operations are executed either in the order in which the voice commands of the driver are input or in an arbitrary order, without considering the relation between or among the operations. Accordingly, any convenience gained as a result of the above-mentioned devices may be lost in such a scenario.

SUMMARY

The present disclosure has been made to solve the above-mentioned problems occurring in the related art while advantages achieved by the related art are maintained intact.

An aspect of the present disclosure provides a user input processing apparatus and a user input processing method for a vehicle that effectively processes user input such that user convenience is improved.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, a user input processing apparatus for a vehicle includes: an operation command generator recognizing a first semantic frame from a user voice, generating a first operation command based on the recognized first semantic frame, recognizing a second semantic frame from the user voice, and generating a second operation command based on the recognized second semantic frame; a sequence determination unit generating an execution sequence of the first operation command and the second operation command; and a controller controlling an execution of the first operation command and the second operation command based on the generated execution sequence and a relation between the first operation command and the second operation command.

The user input processing apparatus may further include a determination unit determining whether each of the first operation command and the second operation command is executable.

When the relation between the first operation command and the second operation command is present, the controller may control the execution of the first operation command and the second operation command based on the determination of whether each of the first operation command and the second operation command are executable.

When the first operation command is not executable, the controller may cancel the execution of the second operation command.

When the execution of the second operation command is canceled, the controller may generate feedback information for displaying execution state information of the second operation command.

When the first operation command is not executable, the controller may change the second operation command such that execution state information of the first operation command is reflected when the second operation command is executed and may execute the changed second operation command.

The user input processing apparatus may further include a user intent analyzer determining a first intent of a user based on the first semantic frame and determining a second intent of the user based on the second semantic frame.

When the first operation command is not executable, the controller may generate a third operation command based on the first intent and execute the generated third operation command.

The controller may execute the second operation command based on a user response to a result of executing the third operation command.

When both of the first operation command and the second operation command are executable, the controller may execute the first operation command and the second operation command based on the execution sequence.

The sequence determination unit may generate the execution sequence of the first operation command and the second operation command based on a preset operation processing order.

The preset operation processing order may be defined as follows, in order: 1) an operation associated with safety control of the vehicle, 2) an operation associated with real-time processing, 3) an operation associated with information verification, and 4) an operation associated with information sharing with another vehicle.

When an operation processing order of the first operation command is the same as an operation processing order of the second operation command according to the preset operation processing order, the sequence determination unit may determine the execution sequence such that an operation command corresponding to a semantic frame, which is input first in time, from among the first semantic frame corresponding to the first operation command and the second semantic frame corresponding to the second operation command is executed first.

The user input processing apparatus may further include a semantic frame identifier identifying the first semantic frame and the second semantic frame from the user voice.

Furthermore, according to embodiments of the present disclosure, a user input processing method of a vehicle includes: recognizing a first semantic frame from a user voice; generating a first operation command based on the recognized first semantic frame; recognizing a second semantic frame from the user voice; generating a second operation command based on the recognized second semantic frame; generating an execution sequence of the first operation command and the second operation command; and controlling an execution of the first operation command and the second operation command based on the generated execution sequence and a relation between the first operation command and the second operation command.

The controlling of the execution of the first operation command and the second operation command may determining whether each of the first operation command and the second operation command is executable.

The determining of whether each of the first operation command and the second operation command is executable may be performed when the relation between the first operation command and the second operation command is present.

The controlling of the execution of the first operation command and the second operation command may further include, when the first operation command is not executable, canceling the execution of the second operation command.

The controlling of the execution of the first operation command and the second operation command may further include, when the execution of the second operation command is canceled, generating feedback information for displaying execution state information of the second operation command.

The controlling of the execution of the first operation command and the second operation command may further include, when the first operation command is not executable, changing the second operation command such that execution state information of the first operation command is reflected when the second operation command is executed and executing the changed second operation command.

BRIEF DESCRIPTION OF THE DRAWINGS

The above and other objects, features and advantages of the present disclosure will be more apparent from the following detailed description taken in conjunction with the accompanying drawings:

FIG. 3 is a table for describing an execution sequence determining operation of a user input processing apparatus for a vehicle, according to embodiments of the present disclosure;

Figure 1:
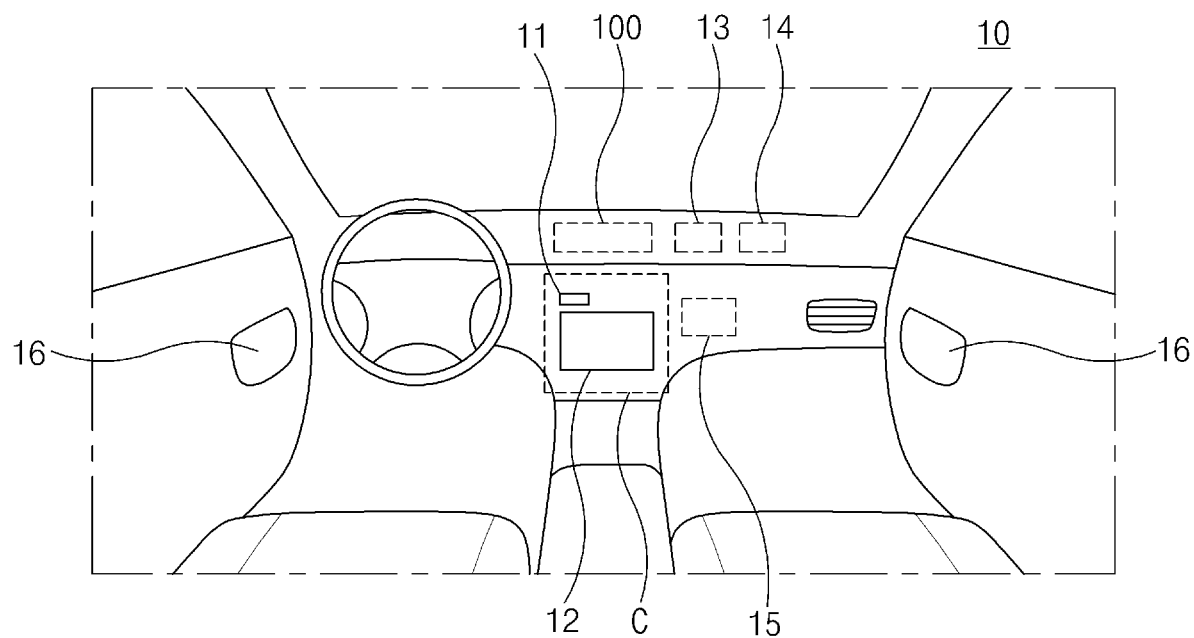
FIG. 1 illustrates an interior of a vehicle, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. Hereinafter, embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of embodiments of the present disclosure, the terms 1st, 2nd, first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this disclosure belongs. It will be understood that terms used herein should be interpreted as having a meaning that is consistent with their meaning in the context of this disclosure and the relevant art and will not be interpreted in an idealized or overly formal sense unless expressly so defined herein.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the presently disclosed embodiments, FIG. 1 illustrates an interior of a vehicle, according to embodiments of the present disclosure.

As shown in FIG. 1, a vehicle 10 according to embodiments of the present disclosure may include an input 11, a display 12, a communication 13, a processor 14, storage 15, and a speaker 16 as well as a user input processing apparatus 100.

The input 11 may receive a user voice. For example, the input 11 may include a microphone. In the case where a user voice is received, the input 11 may convert the user voice to an electrical signal and may transmit the electrical signal to the user input processing apparatus 100. The input 11 may be disposed on the center fascia area C of the dashboard or the steering wheel of the vehicle 10. However, embodiments of the present disclosure may not be limited thereto. If being located at a point capable of receiving the user voice, the input 11 may be disposed at any location inside the vehicle 10.

The display 12 may display a screen displaying an operating state of the vehicle 10, a navigation screen, or an infotainment program screen. For example, the display 12 may display a result screen of an operation of the vehicle 10 according to the input user voice. The display 12 may include various display devices such as a Liquid Crystal Display (LCD), a Light Emitting Diode (LED) display, a Plasma Display Panel (PDP) display, an Organic Light Emitting Diode (OLED) display, and a Cathode Ray Tube (CRT) display. Meanwhile, in the case where the display 12 is provided as a touchscreen, the display 12 may receive a touch input from a user.

The communication 13 may communicate with an external device (e.g., another vehicle, an infrastructure, or a server). For example, the communication 13 may transmit or receive a message to or from the external device.

The processor 14 may control overall operations of the vehicle 10. For example, the processor 14 may control various operations such as an operation associated with driving control of a vehicle, an entertainment-related operation, a communication-related operation, a navigation-related operation, an audio and video-related operation, and an air conditioner-related operation. For example, the processor 14 may control the operations of elements disposed inside the vehicle 10, based on an operation command received from the user input processing apparatus 100.

The storage 15 may store data associated with the vehicle 10, data associated with the user of the vehicle 10, or the like. For example, the storage 15 may store driving history data of the vehicle 10, navigation-related data, user's schedule-related data, or personal information-related data.

The speaker 16 may output a sound source under control of the processor 14. For example, in the case where an audio function or a navigation function is implemented, the speaker 16 may output a necessary sound source.

The vehicle 10 according to embodiments of the present disclosure may recognize the user voice, which is being input or which is input, and may perform an operation command corresponding to the recognized voice. Accordingly, the vehicle 10 may perform an operation corresponding to the user voice being input. For example, the vehicle 10 may perform an operation such as the reservation for a destination, the setting of navigation destination, the sending and receiving of a message, question and answer, or information search, in response to the recognition result of the user voice. However, embodiments of the present disclosure are not limited thereto.

All or part of the operations of the vehicle 10 may be related to each other. For example, in the case of an operation of reserving a destination and an operation of setting the reserved destination to a navigation destination, if the execution of the operation of reserving a destination is impossible (e.g., if the reservation for the destination fails), an operation of setting the navigation destination may be unnecessary. Accordingly, the vehicle 10 according to an embodiment of the present disclosure may control the execution of each of operations based on the relation between operations corresponding to the recognized user voice, thereby improving user convenience. This will be described in more detail with reference to the following FIGS. 2 to 10.

It is understood that the interior of the vehicle 10 as described above and illustrated in FIG. 1 is provided merely for demonstration purposes, and should not be treated as limiting the scope of the present disclosure.

Figure 2:
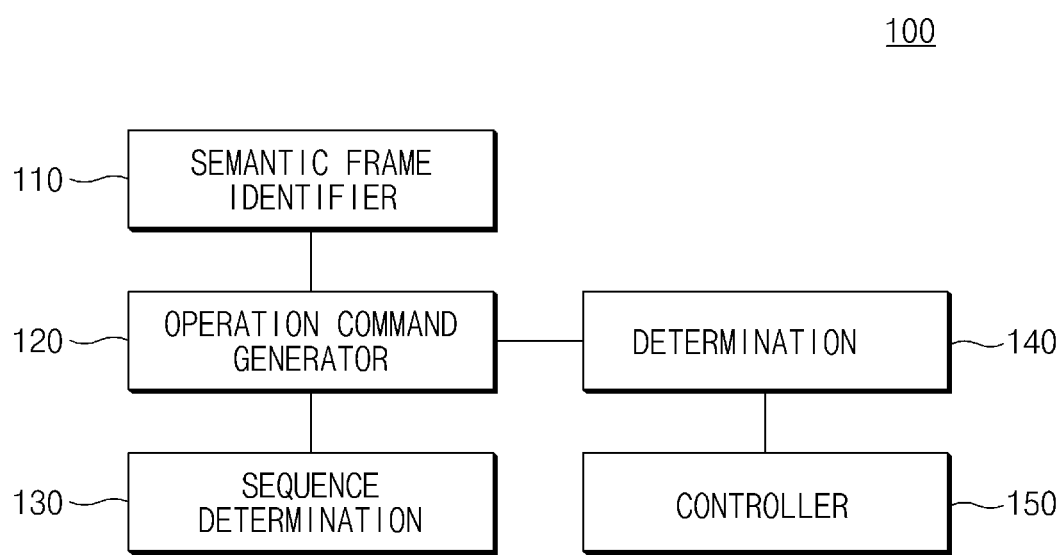
FIG. 2 is a block diagram illustrating a user input processing apparatus for a vehicle, according to embodiments of the present disclosure.

FIG. 2 is a block diagram illustrating a user input processing apparatus for a vehicle, according to embodiments of the present disclosure.

As shown in FIG. 2, the user input processing apparatus 100 for a vehicle may include a semantic frame identifier 110, an operation command generator 120, a sequence determination unit 130, a determination unit 140, and a controller 150.

The semantic frame identifier 110 may identify a semantic frame from a user voice, which is being input or which is input. For example, the semantic frame identifier 110 may analyze the user voice to identify a first semantic frame and a second semantic frame. Herein, the semantic frame may include the predicate of a minimum unit, which is necessary to recognize a user voice and to execute a command corresponding to the recognized voice. In addition, the semantic frame may be defined as a frame structure, which has each dependent element including subject, object, or adverb as a factor, based on the predicate. For example, the semantic frame identifier 110 may identify a first semantic frame (the reservation for A restaurant), a second semantic frame (direction to A restaurant), and a third semantic frame (send the reservation details to 'B' by a text message) from a voice input of a user saying that "book A restaurant, guide to the way, and send reservation details to 'B' by a text message".

The operation command generator 120 may recognize a semantic frame from the user voice to generate an operation command. For example, the operation command generator 120 may recognize the first semantic frame to generate a first operation command (e.g., the reservation for a destination) and may recognize the second semantic frame to generate a second operation command (e.g., the setting of navigation destination). Herein, the first operation command may be a command for operating each of elements of a vehicle, in compliance with the first semantic frame, and the second operation command may be a command for operating each of elements of a vehicle, in compliance with the second semantic frame.

The sequence determination unit 130 may determine the execution sequence of operation commands (e.g., the first operation command and the second operation command) generated by the operation command generator 120. The sequence determination unit 130 may determine the execution sequence of the first operation command and the second operation command, based on a preset operation processing order.

Herein, the preset operation processing order may be defined as the order of an operation associated with safety control of a vehicle, an operation associated with real-time processing, an operation associated with information verification, and an operation associated with sharing information with another vehicle. However, embodiments of the present disclosure are not limited thereto. Referring to FIG. 3, the operation associated with safety control of a vehicle may include an operation command such as vehicle driving control, warning light guide, or parts replacement guide. The operation associated with real-time processing may include an operation such as setting a destination, making a call, or broadcasting. A general processing operation may include an operation such as the reservation for a destination, the registration of a schedule, or the registration of a notification. The operation associated with information verification may include an operation such as the verification of weather, a missed call, or a schedule. The operation associated with sharing information may include an operation such as the sending of a text message, the SNS registration, or the music sharing.

For example, in the case where the first operation command is an operation command associated with the reservation of a destination and the second operation command is an operation command associated with the setting of a navigation destination, the sequence determination unit 130 may determine the execution sequence in order of the operation command associated with the reservation of a destination and the operation command associated with the setting of a navigation destination.

Meanwhile, if the operation processing order of the first operation command is the same as the operation processing order of the second operation command depending on a preset operation processing order, the sequence determination unit 130 may determine the execution sequence such that an operation command corresponding to a semantic frame, which is input first in time, from among the first semantic frame corresponding to the first operation command and the second semantic frame corresponding to the second operation command is first executed.

Returning to FIG. 2, the determination unit 140 may determine whether the operation command is executable. For example, the determination unit 140 may determine whether each of a first operation corresponding to the first operation command and a second operation corresponding to the second operation command is executable. Herein, whether an operation is executable may mean whether an operation corresponding to an operation command is capable of being completed. In the case where an operation corresponding to an operation command is not capable of being completed, the determination unit 140 may determine that the execution of the operation command is not executable.

The controller 150 may control the execution of each of operation commands based on a relation between operation commands and an execution sequence. For example, the controller 150 may control the execution of each of the first operation command and the second operation command, based on a relation between the first operation command (e.g., an operation command associated with the reservation for a destination) and the second operation command (e.g., an operation command associated with the setting of a navigation destination) and the execution sequence.

In the case where the relation between the first operation command and the second operation command is present, the controller 150 may control the execution of each of the first operation command and the second operation command based on the determination result of the determination unit 140. For example, the controller 150 may determine that a relation between the first operation command and the second operation command is present, based on the generation time of each of the first operation command and the second operation command, whether common information (e.g., in the case of an operation is related to the same destination) is included in operation details, or the like.

When it is determined depending on the determination result of the determination unit 140 that the execution of the first operation command is impossible, the controller 150 may cancel the execution of the second operation command related to the first operation command. For example, when the first operation command is an operation command associated with the reservation for A restaurant and the second operation command is an operation command associated with the setting of the destination of A restaurant, if the execution of the first operation command is impossible (e.g., the reservation for A restaurant is impossible), the controller 150 may cancel the execution of the second operation command. The cancellation of the execution of the above-described operation command may meet the user intent. Accordingly, the convenience of vehicle usage of the user may be improved.

In the case where the controller 150 cancels the execution of the second operation command, the controller 150 may generate feedback information for displaying the execution state information of the second operation command. For example, in the case where the controller 150 cancels the execution of the operation of setting the destination of A restaurant, the controller 150 may generate feedback information for notifying the user of 'cancellation of execution'. The feedback information may be displayed through the display 12 (refer to FIG. 1), thereby improving the convenience of the user.

Furthermore, when the controller 150 cancels the execution of the second operation command, the controller 150 may execute the second operation command that is changed depending on a default setting value of second operation command. For example, when the controller 150 cancels the execution of the operation command for setting the destination of A restaurant, the controller 150 may execute an operation command for setting the destination to the default setting value being a 'home' or a 'workplace'.

Moreover, when the execution of the first operation command is impossible, the controller 150 may change the second operation command and may execute the changed second operation command. For example, the controller 150 may change the second operation command such that the execution state information of the first operation command is reflected when the second operation command is executed. For example, when the first operation command is an operation command associated with the reservation for A restaurant and the second operation command is an operation command associated with text message transfer for sending a text message of 'guide to the reservation for A restaurant' to another vehicle, in the case where the execution of the first operation command is impossible (e.g., the reservation for A restaurant is impossible), the controller 150 may change the second operation command and may execute an operation command associated with text message transfer for sending a text message of 'the reservation for A restaurant failed'.

In the meantime, when it is determined depending on the determination result of the determination unit 140 that both the first operation command and the second operation command are executable, the controller 150 may execute the first operation command and the second operation command depending on the execution sequence. In addition, when it is determined (depending on the determination result of the determination unit 140) that both the first operation command and the second operation command are not executable, the controller 150 may cancel the execution of each of the first operation command and the second operation command and may notify the user or may propose the execution of another operation having an alternative feature.

Figure 4:
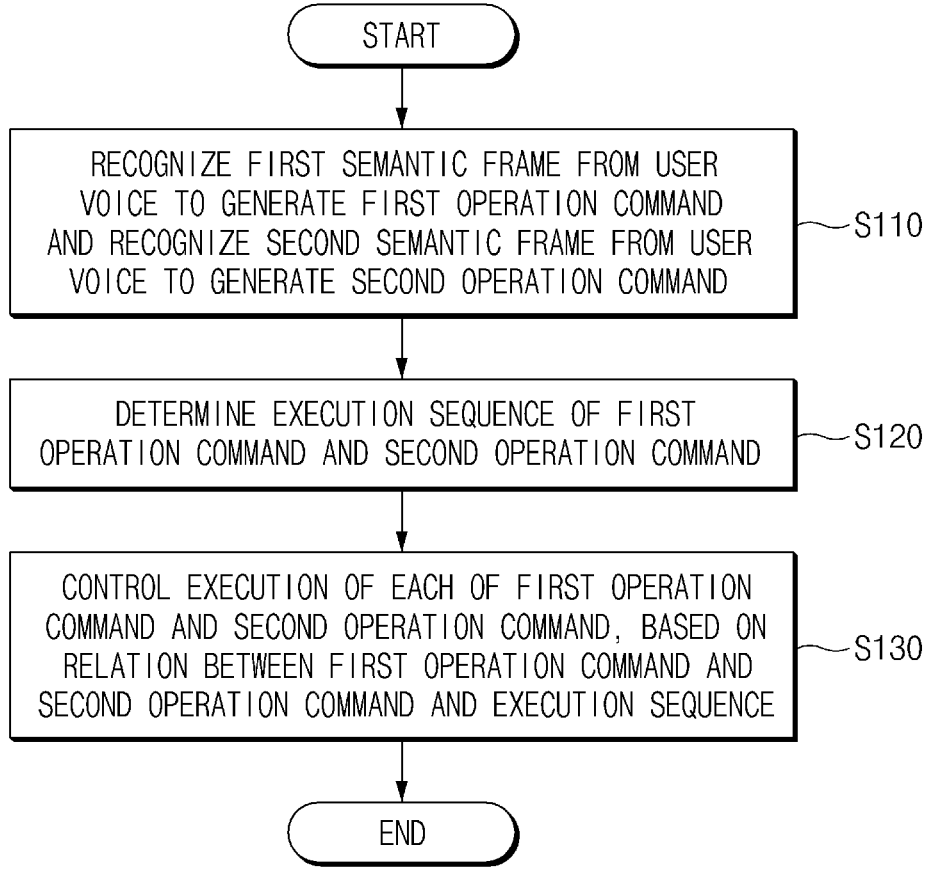
FIGS. 4 to 6 are flowcharts illustrating a user input processing method for a vehicle, according to embodiments of the present disclosure.
Figure 5:
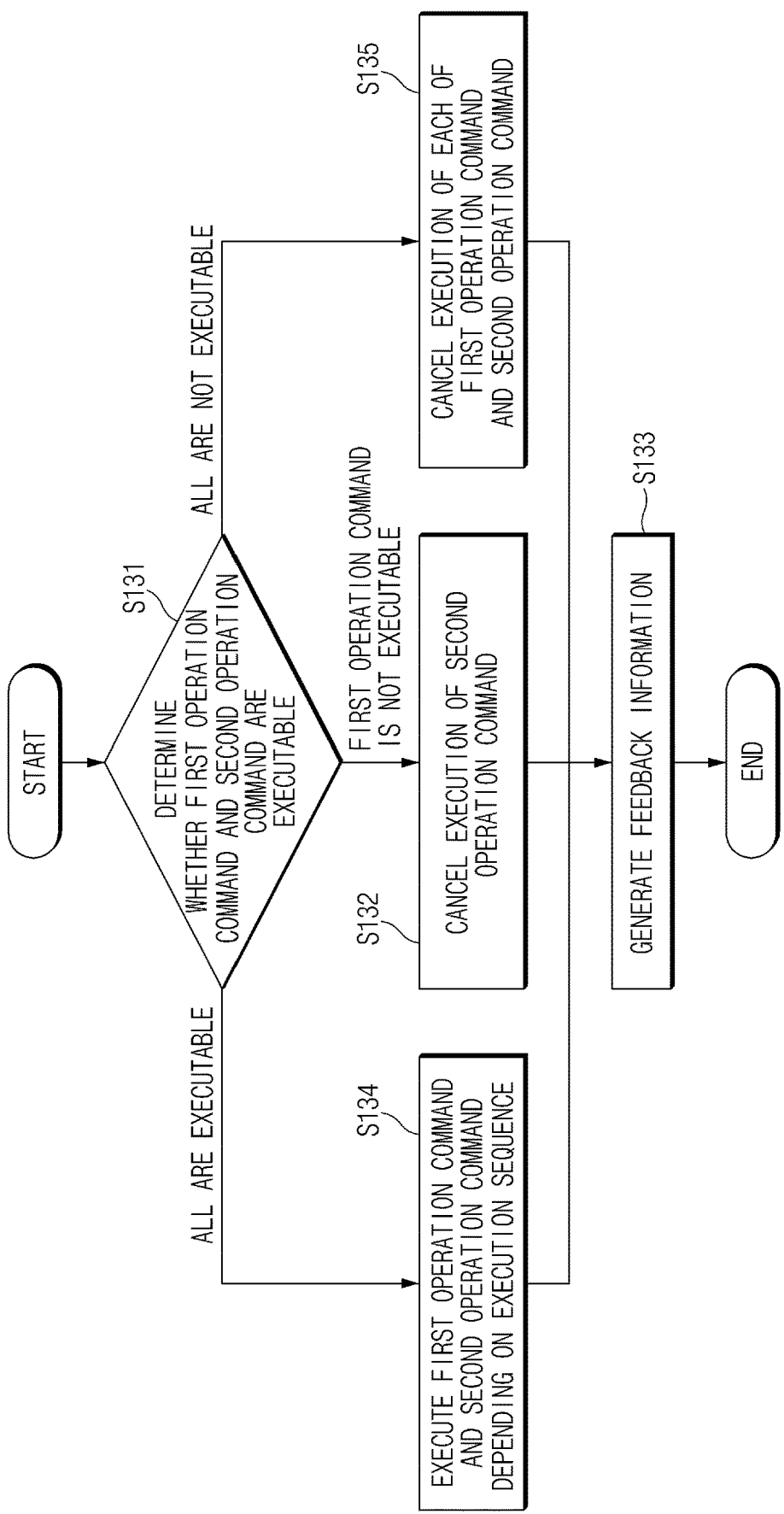
Figure 6:
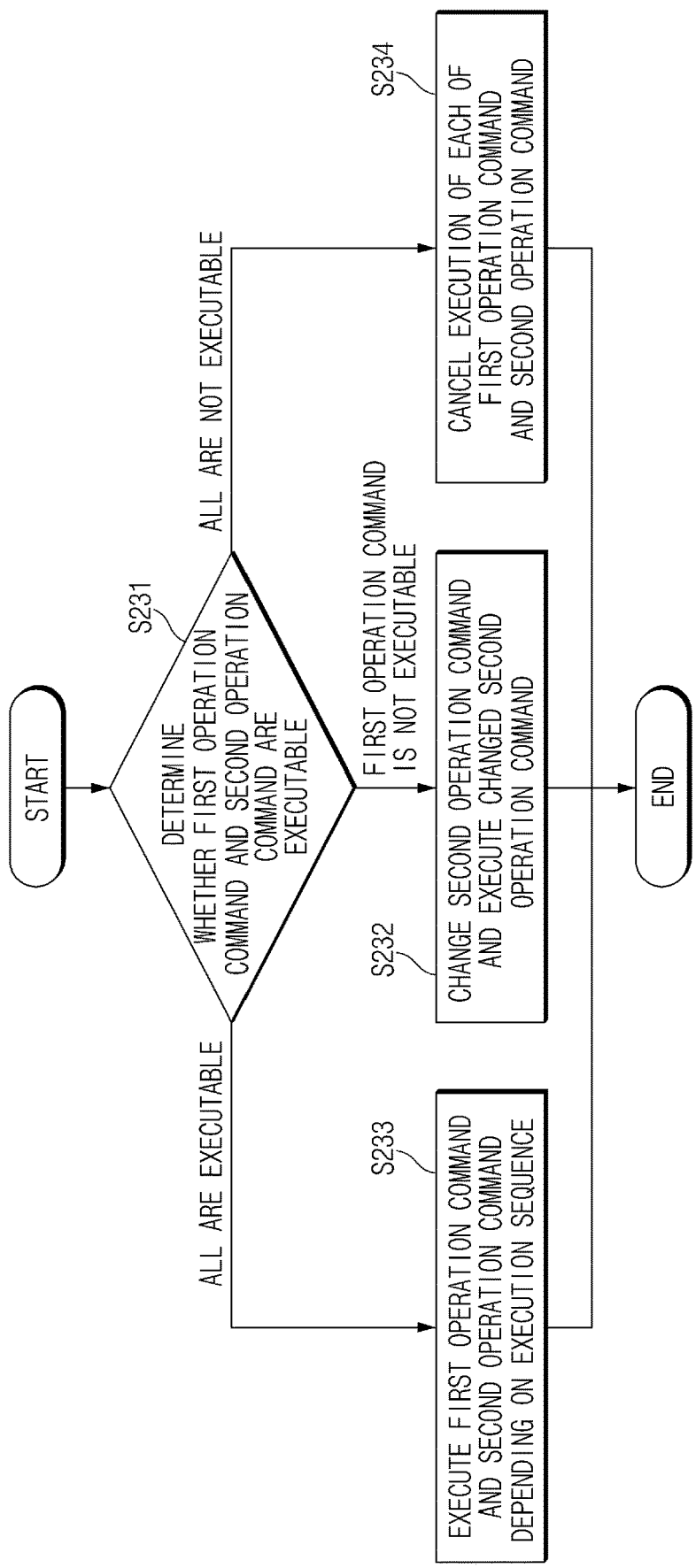
Figure 7:
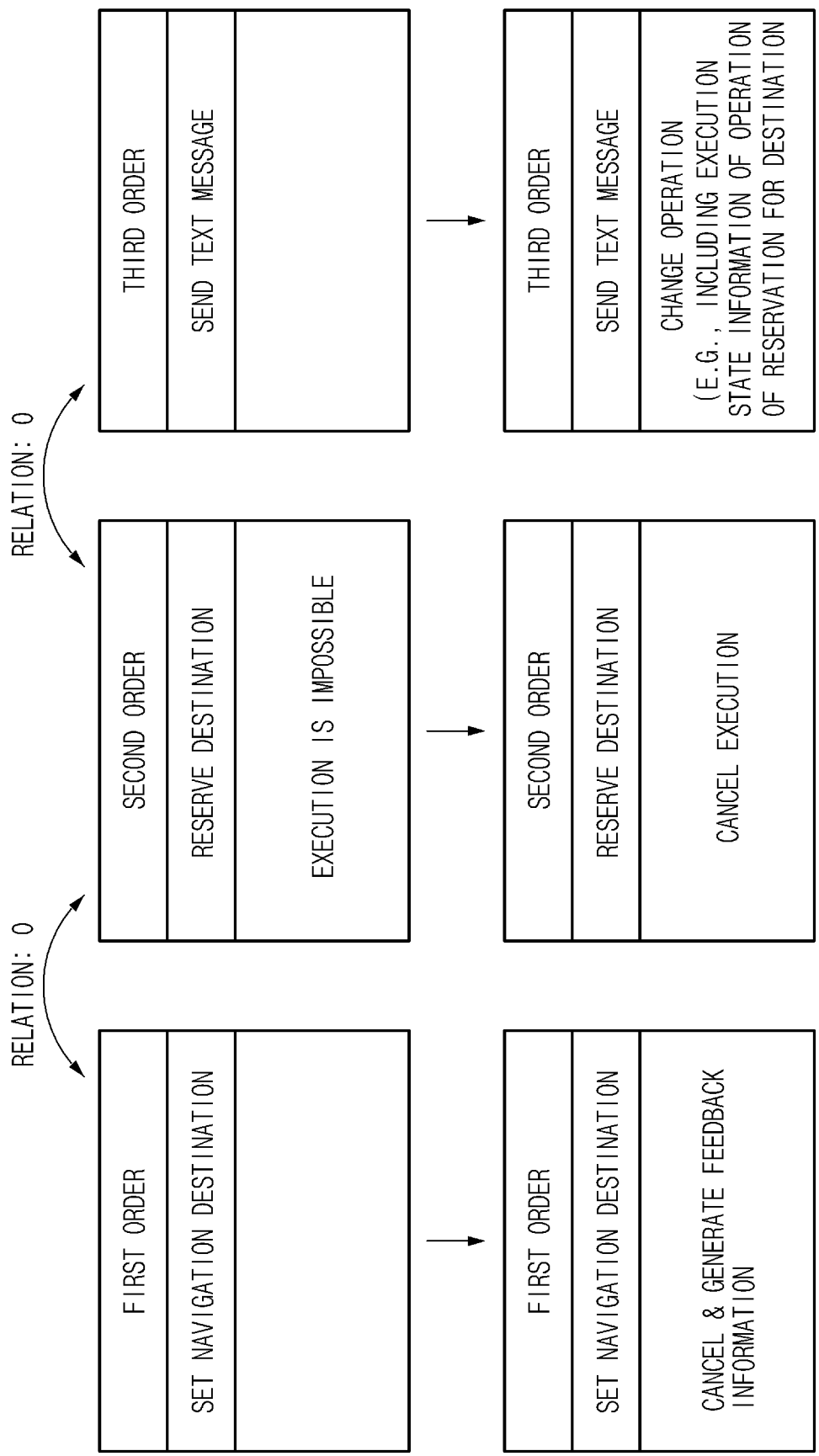
FIG. 7 is a diagram for conceptually describing a user input processing method of a vehicle according to FIGS. 4 to 6.

FIGS. 4 to 6 are flowcharts illustrating a user input processing method for a vehicle, according to embodiments of the present disclosure. FIG. 7 is a diagram for conceptually describing a user input processing method of a vehicle according to FIGS. 4 to 6.

Firstly, referring to FIG. 4, a user input processing method for a vehicle may include operation S110 of recognizing a first semantic frame from a user voice to generate a first operation command and recognizing a second semantic frame from the user voice to generate a second operation command, operation S120 of determining an execution sequence of the first operation command and the second operation command, and operation S130 of controlling the execution of each of the first operation command and the second operation command based on a relation between the first operation command and the second operation command and the execution sequence.

Hereinafter, above-described operation S110 to operation S130 will be described with reference to FIG. 2 in more detail.

In operation S110, the operation command generator 120 may recognize a semantic frame from the user voice to generate an operation command. For example, the operation command generator 120 may recognize the first semantic frame to generate a first operation command (e.g., the reservation for a destination) and may recognize the second semantic frame to generate a second operation command (e.g., the setting of navigation destination).

In operation S120, the sequence determination unit 130 may determine the execution sequence of operation commands (e.g., the first operation command and the second operation command) generated by the operation command generator 120. The sequence determination unit 130 may determine the execution sequence of the first operation command and the second operation command, based on a preset operation processing order.

In operation S130, the controller 150 may control the execution of each of operation commands based on a relation between operation commands and an execution sequence. For example, the controller 150 may control the execution of each of the first operation command and the second operation command, based on a relation between the first operation command (e.g., an operation command associated with the reservation for a destination) and the second operation command (e.g., an operation command associated with the setting of a navigation destination) and the execution sequence.

Referring next to FIG. 5, operation S130 may include operation S131 of determining whether a first operation command and a second operation command are executable, operation S132 of canceling the execution of the second operation if the execution of the first operation command is impossible, operation S133 of generating feedback information, operation S134 of executing the first operation command and the second operation command depending on an execution sequence if both the first operation command and the second operation command are executable, and operation S135 of canceling the execution of each of the first operation command and the second operation command if both the first operation command and the second operation command are not executable. Herein, it is assumed that each of the first operation command and the second operation command is an operation command that is related to each other.

In operation S131, the determination unit 140 may determine whether each of a first operation corresponding to the first operation command and a second operation corresponding to the second operation command is executable. Herein, whether an operation is executable may mean whether an operation corresponding to an operation command is capable of being completed. In the case where an operation corresponding to an operation command is not capable of being completed, the determination unit 140 may determine that the execution of the operation command is not executable.

In operation S132, when it is determined that the execution of the first operation command is impossible, the controller 150 may cancel the execution of the second operation command related to the first operation command. The cancellation of the execution of the above-described operation command may meet the user intent. Accordingly, the convenience of the user may be improved.

In operation S133, the controller 150 may generate feedback information for displaying the execution state information of the second operation command. The feedback information may be displayed through the display 12 (refer to FIG. 1), thereby improving the convenience of the user.

In operation S134, when it is determined that both the first operation command and the second operation command are executable, the controller 150 may execute the first operation command and the second operation command depending on the execution sequence.

In operation S135, when it is determined that both the first operation command and the second operation command are not executable, the controller 150 may cancel the execution of each of the first operation command and the second operation command and may notify the user or may propose the execution of another operation having an alternative feature.

Referring next to FIG. 6, in another example, operation S130 may include operation S231 of determining whether the first operation command and the second operation command are executable, operation S232 of changing a second operation command and executing the changed second operation command if the execution of the first operation command is impossible, operation S233 of executing the first operation command and the second operation command depending on an execution sequence if both the first operation command and second operation command are executable, and operation S234 of canceling the execution of each of the first operation command and the second operation command if both the first operation command and the second operation command are not executable.

In operation S231, the determination unit 140 may determine whether each of a first operation corresponding to the first operation command and a second operation corresponding to the second operation command is executable.

In operation S232, in the case where the execution of the first operation command is impossible, the controller 150 may change the second operation command and may execute the changed second operation command.

In operation S233, when it is determined that both the first operation command and the second operation command are executable, the controller 150 may execute the first operation command and the second operation command depending on the execution sequence.

In operation S234, when it is determined that both the first operation command and the second operation command are not executable, the controller 150 may cancel the execution of each of the first operation command and the second operation command and may notify the user or may propose the execution of another operation having an alternative feature.

According to embodiments of the present disclosure, a user input processing method of a vehicle illustrated in FIGS. 4 to 6 will be described with reference to FIG. 7.

Firstly, the case where the first operation command is an operation command associated with the reservation for a destination and the second operation command is an operation command associated with the setting of a navigation destination will be described.

In the case of the first operation command, the execution sequence may be determined as the second order depending on a preset operation processing order. In the case of the second operation command, the execution sequence may be determined as the first order depending on the preset operation processing order. The first operation command and the second operation command may be operation commands, which are related to each other, as an operation command associated with the same destination.

For example, when the first operation command is an operation command associated with the reservation for A restaurant and the second operation command is an operation command for setting "A restaurant" to a navigation destination, in the case where the execution of the first operation command is impossible (e.g., the reservation for A restaurant is impossible), the controller 150 may cancel the execution of the second operation command. That is, even though the execution sequence of the second operation command leads to the execution sequence of the first operation command, the execution of the second operation command may be canceled. In addition, when the controller 150 cancels the execution of the operation of setting the destination of A restaurant, the controller 150 may generate feedback information for notifying the user of 'cancellation of execution'.

Next, the case where the first operation command is an operation command associated with the reservation for a destination and the second operation command is an operation command associated with the sending of a text message is described.

In the case of the first operation command, the execution sequence may be determined as the first order in a relation with the second operation command, depending on a preset operation processing order. In the case of the second operation command, the execution sequence may be determined as the second order in a relation with the first operation command, depending on the preset operation processing order. The first operation command and the second operation command may be operation commands, which are related to each other, as an operation command associated with the same destination.

For example, when the execution of the first operation command is impossible (e.g., the reservation for A restaurant is impossible), the controller 150 may change the second operation command and may execute an operation command associated with text message transfer for sending a text message of 'the reservation for A restaurant failed'.

Figure 8:
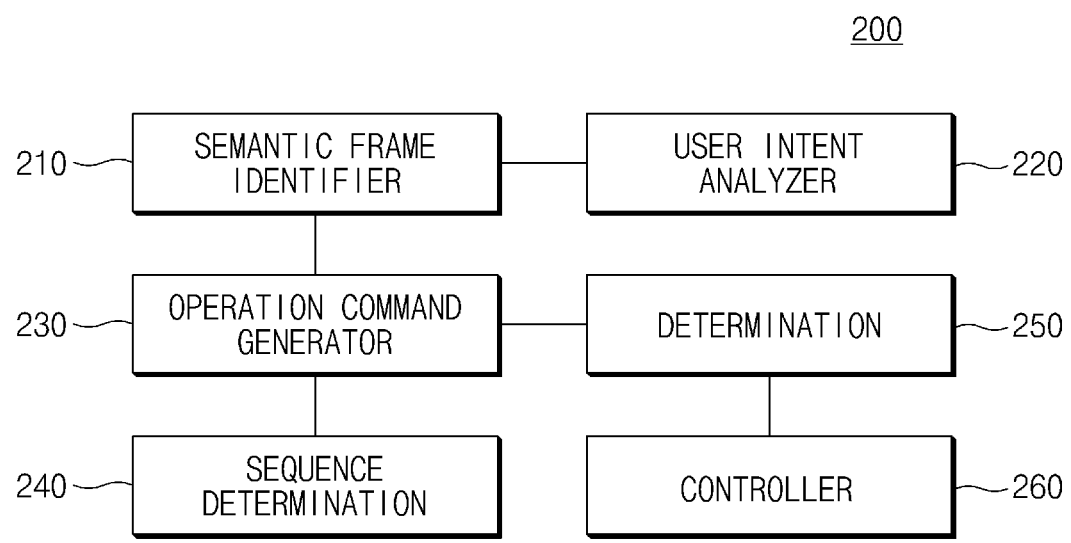
FIG. 8 is an additional block diagram illustrating a user input processing apparatus for a vehicle, according to embodiments of the present disclosure.

FIG. 8 is an additional block diagram illustrating a user input processing apparatus for a vehicle, according to embodiments of the present disclosure.

As shown in FIG. 8, a user input processing apparatus 200 for a vehicle may include a semantic frame identifier 210, a user intent analyzer 220, an operation command generator 230, a sequence determination unit 240, a determination unit 250, and a controller 260.

Since the semantic frame identifier 210, the operation command generator 230, the sequence determination unit 240, and the determination unit 250 are substantially the same as the semantic frame identifier 110, the operation command generator 120, the sequence determination unit 130, and the determination unit 140 described with reference to FIG. 2. Accordingly, duplicated details will not be repeated here. Hereinafter, the user intent analyzer 220 and the controller 260 will be described primarily.

The user intent analyzer 220 may interpret a semantic frame to analyze the intent of a user. For example, the user intent analyzer 220 may interpret a first semantic frame to analyze the first intent of the user and may interpret a second semantic frame to analyze the second intent of the user. For example, in the case where the first semantic frame is "the reservation for A restaurant", the user intent analyzer 220 may analyze the first intent of the user as 'the reservation for a restaurant'.

When it is determined (depending on the determination result of the determination unit 250) that the execution of a first operation command is impossible, the controller 260 may generate and execute a third operation command based on the first intent. For example, the controller 260 may generate and execute an operation command of displaying a recommendation screen for recommending the usage of K restaurant different from A restaurant, with reference to a user driving history or the like stored in the storage 15 (refer to FIG. 1).

The controller 260 may execute a second operation command based on a user response to the execution result of a third operation command. For example, the controller 260 may display a screen for recommending the usage of K restaurant. In response, in the case where the user selects the reservation for K restaurant, the controller 260 may execute the second operation command (e.g., setting of K restaurant to a navigation destination).

Accordingly, when the execution of an operation command corresponding to the input user voice is impossible, the user input processing apparatus 200 for the vehicle may generate and execute an operation command of an alternative feature with reference to the history data of the user, thereby improving the convenience of the user.

Figure 9:
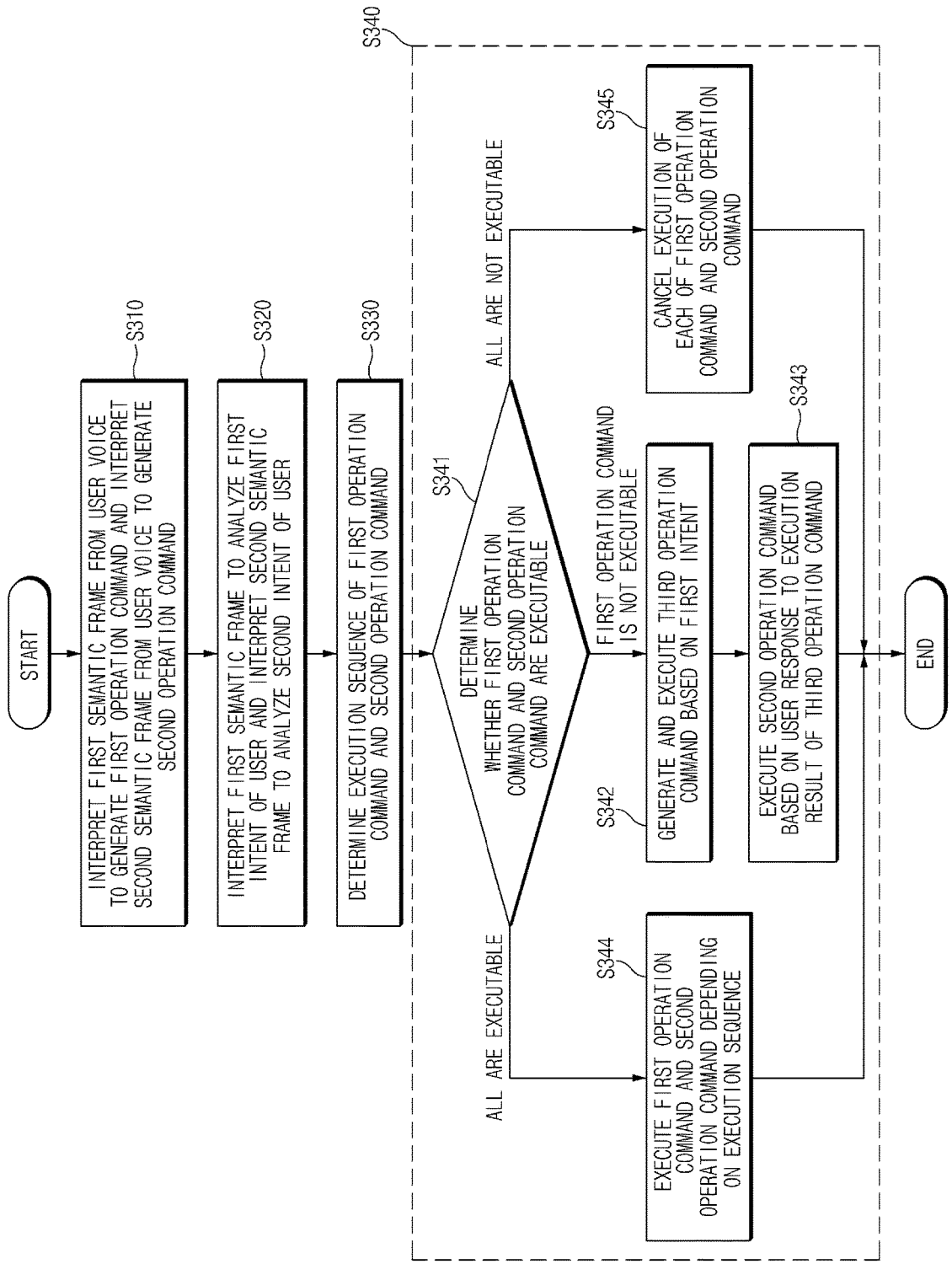
FIG. 9 is an additional flowchart illustrating a user input processing method for a vehicle, according to embodiments of the present disclosure.
Figure 10:
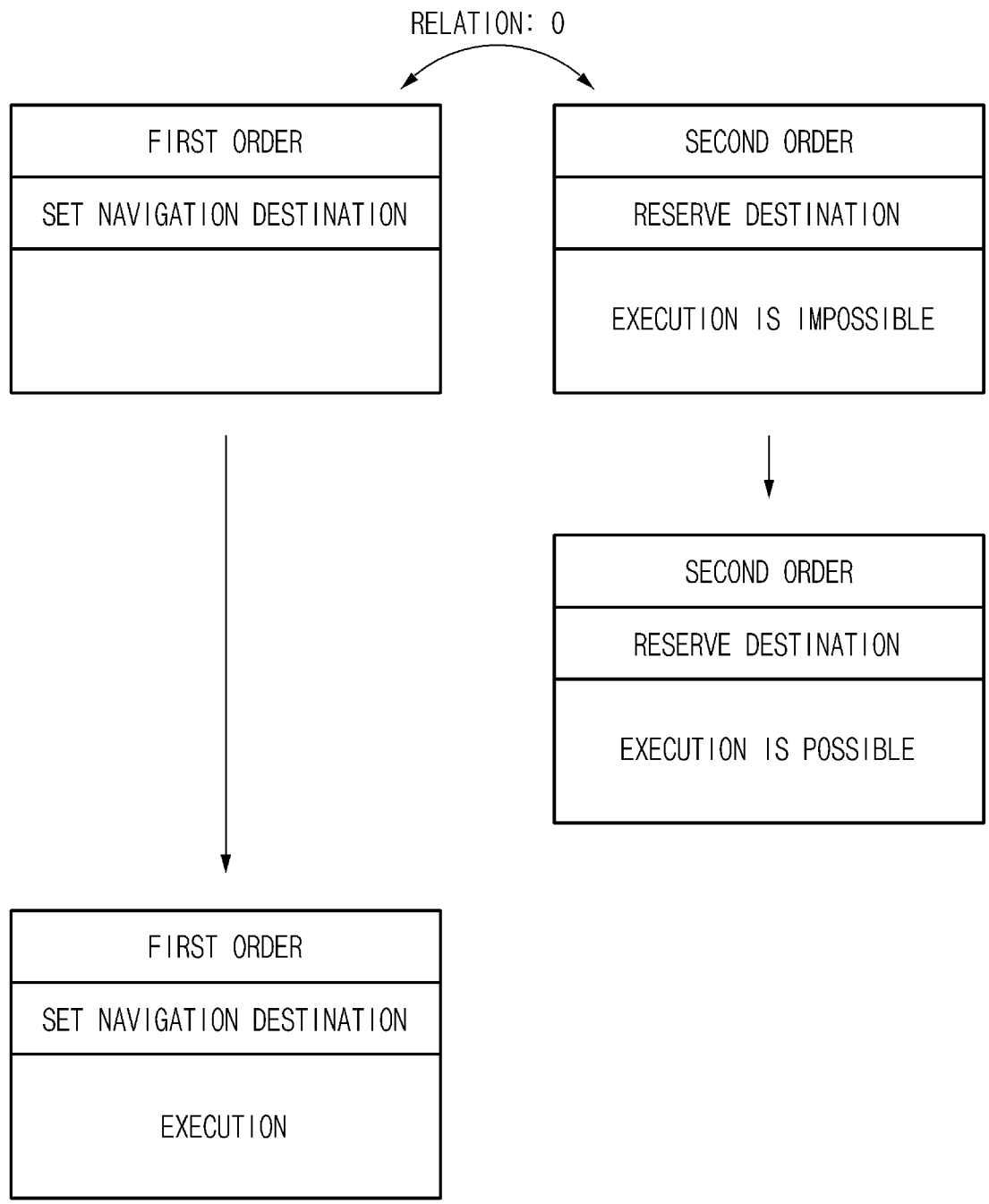
FIG. 10 is a diagram for conceptually describing a user input processing method of a vehicle according to FIG. 9.

FIG. 9 is an additional flowchart illustrating a user input processing method for a vehicle, according to embodiments of the present disclosure. FIG. 10 is a diagram for conceptually describing a user input processing method of a vehicle according to FIG. 9.

Firstly, referring to FIG. 9, a user input processing method for a vehicle may include operation S310 of recognizing a first semantic frame from a user voice to generate a first operation command and recognizing a second semantic frame to generate a second operation command, operation S320 of interpreting the first semantic frame to analyze the first intent of a user and interpreting the second semantic frame to analyze the second intent of the user, operation S330 of determining the execution sequence of the first operation command and the second operation command, and operation S340 of controlling the execution of each of the first operation command and the second operation command based on the relation between the first operation command and the second operation command, the execution sequence, and the first intent or second intent.

Hereinafter, above-described operation S310 to operation S340 will be described with reference to FIG. 8 in more detail.

In operation S310, the operation command generator 230 may recognize a semantic frame from the user voice to generate an operation command. For example, the operation command generator 120 may recognize the first semantic frame to generate a first operation command (e.g., the reservation for a destination) and may recognize the second semantic frame to generate a second operation command (e.g., the setting of navigation destination).

In operation S320, the user intent analyzer 220 may interpret a semantic frame to analyze the intent of a user. For example, the user intent analyzer 220 may interpret a first semantic frame to analyze the first intent of the user and may interpret a second semantic frame to analyze the second intent of the user.

In operation S330, the sequence determination unit 240 may determine the execution sequence of operation commands (e.g., the first operation command and the second operation command) generated by the operation command generator 230. The sequence determination unit 240 may determine the execution sequence of the first operation command and the second operation command, based on a preset operation processing order.

In operation S340, the controller 260 may control the execution of each of operation commands, based on the relation between operation commands, the execution sequence, and the first intent or the second intent.

Operation S340 may include operation S341 of determining whether the first operation command and the second operation command are executable, operation S342 of generating and executing a third operation command based on a first intent if the execution of the first operation command is impossible, operation S343 of executing the second operation command based on a user response to the execution result of the third operation command, operation S344 of executing the first operation command and the second operation command depending on an execution sequence if both the first operation command and second operation command are executable, and operation S345 of canceling the execution of each of the first operation command and the second operation command if both the first operation command and the second operation command are not executable. Herein, it is assumed that each of the first operation command and the second operation command is an operation command that is related to each other.

In operation S341, the determination unit 250 may determine whether each of a first operation corresponding to the first operation command and a second operation corresponding to the second operation command is executable.

In operation S342, when it is determined that the execution of a first operation command is impossible, the controller 260 may generate and execute a third operation command based on the first intent.

In operation S343, the controller 260 may execute the second operation command based on a user response to the execution result of the third operation command.

In operation S344, when it is determined that both the first operation command and the second operation command are executable, the controller 260 may execute the first operation command and the second operation command depending on the execution sequence.

In operation S345, when it is determined that both the first operation command and the second operation command are not executable, the controller 260 may cancel the execution of each of the first operation command and the second operation command and may notify the user or may propose the execution of another operation having an alternative feature.

As shown in FIG. 10, the case where the first operation command is an operation command associated with the reservation for a destination and the second operation command is an operation command associated with the setting of a navigation destination will be described.

In the case of the first operation command, the execution sequence may be determined as the second order depending on a preset operation processing order. In the case of the second operation command, the execution sequence may be determined as the first order depending on the preset operation processing order. The first operation command and the second operation command may be operation commands, which are related to each other.

When the execution of the first operation command is impossible, the controller 260 may generate and execute an operation command of displaying a recommendation screen for recommending the usage of K restaurant different from A restaurant, with reference to a user driving history or the like stored in the storage 15 (refer to FIG. 1).

The controller 260 may display a screen for recommending the usage of K restaurant. In response, in the case where the user selects the reservation for K restaurant, the controller 260 may execute the second operation command (e.g., setting of K restaurant to a navigation destination).

Figure 11:
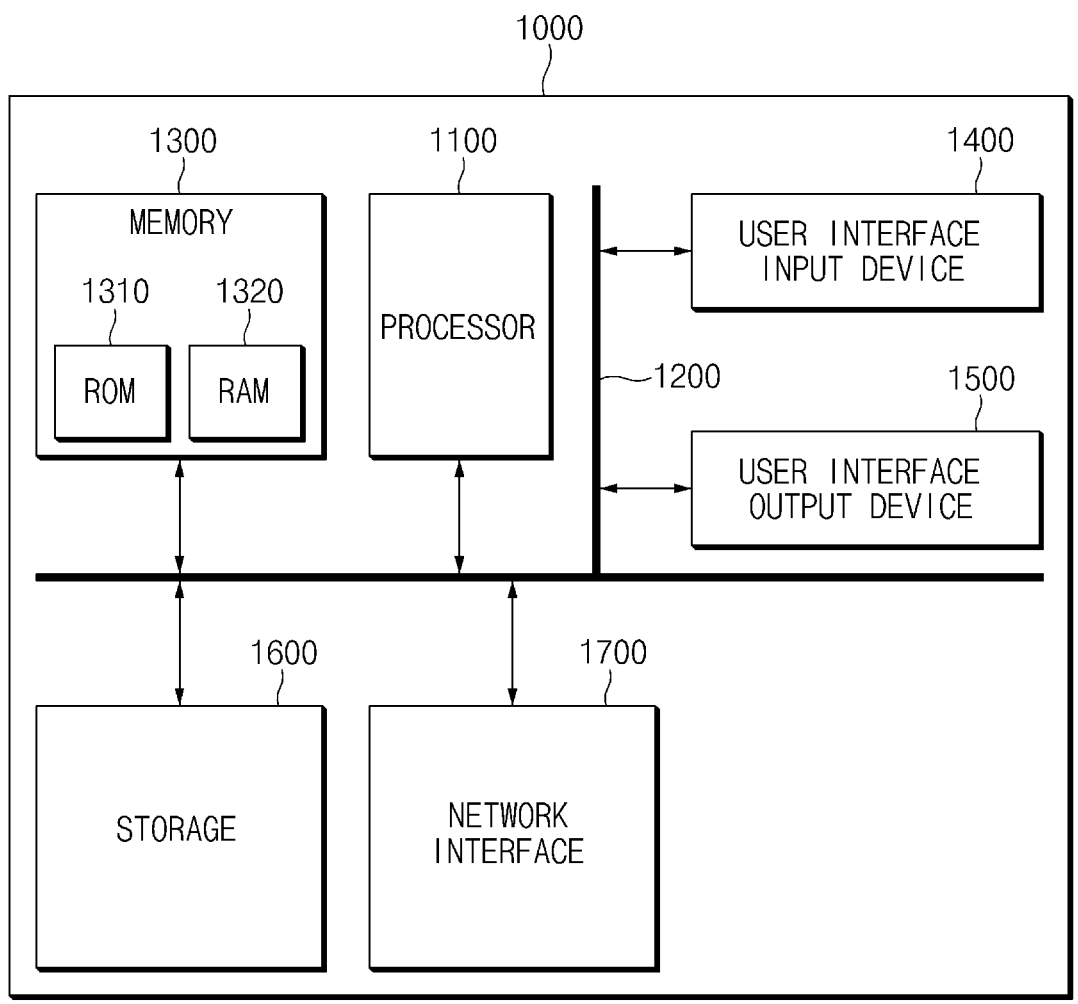
FIG. 11 is a block diagram illustrating a computing system for performing a user input processing method for a vehicle, according to embodiments of the present disclosure.

FIG. 11 is a block diagram illustrating a computing system for performing a user input processing method for a vehicle, according to embodiments of the present disclosure.

As shown in FIG. 11, the user input processing method for a vehicle may be implemented through a computing system. A computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

According to embodiments of the present disclosure, a user input processing apparatus and a user input processing method for a vehicle may efficiently process a user input, thereby improving user convenience.

Hereinabove, although the present disclosure has been described with reference to certain embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A user input processing apparatus for a vehicle, comprising:
   an operation command generator recognizing a first semantic frame from a user voice, generating a first operation command based on the recognized first semantic frame, recognizing a second semantic frame from the user voice, and generating a second operation command based on the recognized second semantic frame;
   a sequence determination unit generating an execution sequence of the first operation command and the second operation command based on a preset operation processing order; and
   a controller controlling an execution of the first operation command and the second operation command based on the generated execution sequence and a relation between the first operation command and the second operation command,
   wherein the present operation processing order is defined as follows, in order: 1) an operation associated with safety control of the vehicle, 2) an operation associated with real-time processing, 3) an operation associated with information verification, and 4) an operation associated with information sharing with another vehicle.

2. The user input processing apparatus of claim 1, further comprising:
   a determination unit determining whether each of the first operation command and the second operation command is executable.

3. The user input processing apparatus of claim 2, wherein, when the relation between the first operation command and the second operation command is present, the controller controls the execution of the first operation command and the second operation command based on the determination of whether each of the first operation command and the second operation command are executable.

4. The user input processing apparatus of claim 3, wherein, when the first operation command is not executable, the controller cancels the execution of the second operation command.

5. The user input processing apparatus of claim 4, wherein, when the execution of the second operation command is canceled, the controller generates feedback information for displaying execution state information of the second operation command.

6. The user input processing apparatus of claim 3, wherein, when the first operation command is not executable, the controller changes the second operation command such that execution state information of the first operation command is reflected when the second operation command is executed, and executes the changed second operation command.

7. The user input processing apparatus of claim 3, further comprising:
   a user intent analyzer determining a first intent of a user based on the first semantic frame and determining a second intent of the user based on the second semantic frame.

8. The user input processing apparatus of claim 7, wherein, when the first operation command is not executable, the controller generates a third operation command based on the first intent and executes the generated third operation command.

9. The user input processing apparatus of claim 8, wherein the controller executes the second operation command based on a user response to a result of executing the third operation command.

10. The user input processing apparatus of claim 2, wherein, when both of the first operation command and the second operation command are executable, the controller executes the first operation command and the second operation command based on the execution sequence.

11. The user input processing apparatus of claim 1, wherein, when an operation processing order of the first operation command is the same as an operation processing order of the second operation command according to the preset operation processing order, the sequence determination unit determines the execution sequence such that an operation command corresponding to a semantic frame, which is input first in time, from among the first semantic frame corresponding to the first operation command and the second semantic frame corresponding to the second operation command is executed first.

12. The user input processing apparatus of claim 1, further comprising:
   a semantic frame identifier identifying the first semantic frame and the second semantic frame from the user voice.

13. A user input processing method of a vehicle, the method comprising:
   recognizing a first semantic frame from a user voice;
   generating a first operation command based on the recognized first semantic frame;
   recognizing a second semantic frame from the user voice;
   generating a second operation command based on the recognized second semantic frame;
   generating an execution sequence of the first operation command and the second operation command based on a preset operation processing order; and
   controlling an execution of the first operation command and the second operation command based on the generated execution sequence and a relation between the first operation command and the second operation command, wherein the present operation processing order is defined as follows, in order: 1) an operation associated with safety control of the vehicle, 2) an operation associated with real-time processing, 3) an operation associated with information verification, and 4) an operation associated with information sharing with another vehicle.

14. The method of claim 13, wherein the controlling of the execution of the first operation command and the second operation command comprises:
determining whether each of the first operation command and the second operation command is executable.

15. The method of claim 14, wherein the determining of whether each of the first operation command and the second operation command is executable is performed when the relation between the first operation command and the second operation command is present.

16. The method of claim 15, wherein the controlling of the execution of the first operation command and the second operation command comprises:
when the first operation command is not executable, canceling the execution of the second operation command.

17. The method of claim 16, wherein the controlling of the execution of the first operation command and the second operation command comprises:
when the execution of the second operation command is canceled, generating feedback information for displaying execution state information of the second operation command.

18. The method of claim 15, wherein the controlling of the execution of the first operation command and the second operation command comprises:
when the first operation command is not executable, changing the second operation command such that execution state information of the first operation command is reflected when the second operation command is executed; and
executing the changed second operation command.

* * * * *